Jan. 20, 1970     E. C. TURNER ET AL     3,490,302

CHAIN TENSIONER

Filed May 27, 1968

United States Patent Office 3,490,302
Patented Jan. 20, 1970

1

3,490,302
CHAIN TENSIONER
Edward C. Turner, Hitchin, and John Poyser, Letchworth, England, assignors to Borg-Warner Corporation, Chicago, Ill., a corporation of Delaware
Filed May 27, 1968, Ser. No. 732,255
Claims priority, application Great Britain, May 31, 1967, 25,139/67
Int. Cl. F16h 7/08
U.S. Cl. 74—242.11                                8 Claims

ABSTRACT OF THE DISCLOSURE

A chain tensioner particularly for use in confined spaces has a blade spring mechanically interlocked with a plastic shoe. The latter may be of rigid filled nylon and engages the chain to be tensioned.

---

This invention relates to a chain tensioner for chain drives in general which is particularly though not exclusively suitable for use as a tensioner on the timing chain of a motor vehicle engine.

The present invention is based on the utilisation of a synthetic plastics material that will "creep" under load and elevated temperature. One form of chain tensioner embodying this principle is disclosed in our British Patent No. 986,174, but this form of construction is only of limited application for use in confined spaces. It is an aim of this invention to provide a simple, compact, reliable, and cheaply-manufactured chain tensioner.

According to the invention, we provide a chain tensioner comprising a blade spring in mechanically interlocked association with a shoe adapted to contact the chain to be tensioned, the said shoe being of synthetic plastics material that will "creep" under load and elevated temperature.

The spring is preferably mechanically interlocked with the plastics material, and for this purpose the plastics material may have a recess at one end to receive an end of the blade spring, and may have a projection at the other end to pass through a corresponding hole towards or at the other end of the blade spring. By "in mechanically interlocked association" is meant that the interlock is achieved by the geometrical configuration of the parts so interlocked, with the assistance, if desired, of a split pin or the like. The phrase as used herein does not comprehend bonding by adhesive, by moulding, or a connecting by riveting, bolting or screwing.

The hole is advantageously substantially triangular in shape with the apex pointing towards the central part of the blade spring, with the projection being shaped correspondingly in plan: this configuration has been found to provide the minimum weakening of the spring consistent with an adequate amount of material to give sufficient strength to the synthetic plastics shoe. A split-pin may secure the spring to the shoe.

The end of the blade extending into the aforesaid recess may be centrally slotted and the recess may have a central rib to engage in the slot.

The synthetic plastics material may be bored at one end to facilitate attachment of the chain tensioner in relation to its associated chain drive.

The present invention will be better understood from the following particular description of an illustrative embodiment thereof, given with reference to the accompanying drawings, in which.

2

Figure 1:
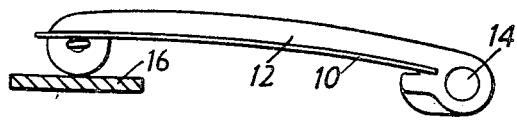
FIG. 1 is a side elevation of a chain tensioner according to the invention.
Figure 2:
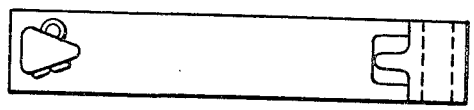
FIG. 2 is an underplan view of the chain tensioner of FIG. 1.
Figure 3:
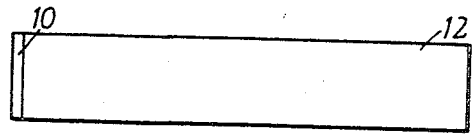
Figure 4:
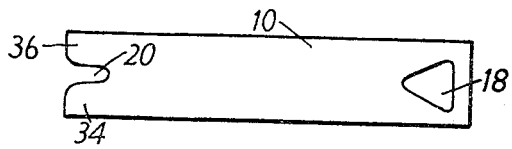
Figure 5:
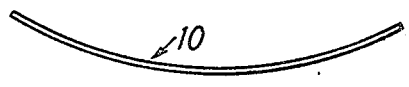
Figure 6:
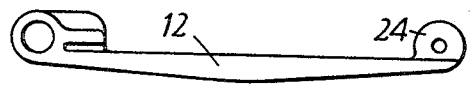
Figure 7:
Figure 8:
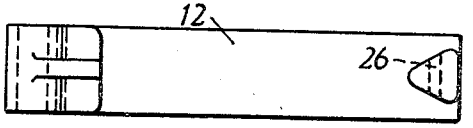
Figure 9:
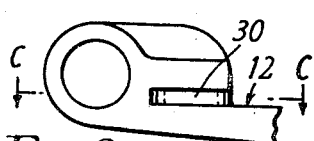
Figure 10:
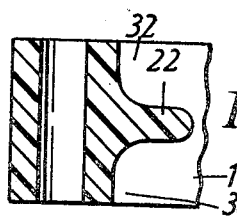

FIG. 3 is a plan view of the chain tensioner of FIG. 1,
FIG. 4 is a plan view of the blade spring,
FIG. 5 is a side elevation of the blade spring,
FIG. 6 is a side elevation of the shoe of synthetic plastics material,
FIG. 7 is a section on the centre line of the shoe,
FIG. 8 is plan view of the shoe of FIGS. 6 and 7,
FIG. 9 is an enlarged view of one end of the shoe, and
FIG. 10 is a section on the line C—C of FIG. 9.

The illustrated chain tensioner comprises a blade spring 10 in association with but not bonded to a chain-contacting shoe 12 of rigid synthetic plastics material. The rigid synthetic plastics material is one which will "creep" under load and under elevated temperature, and the load is provided by the blade spring 10, whose normal configuration is as shown in FIG. 5. The synthetic plastics material 12 is preferably a rigid filled nylon, and the material known as "Nylastron" distributed by Messrs. Polypence Ltd., has been found to be suitable.

The synthetic plastics material 12 has a bore 14 at one end to receive a bolt or pivot pin for attaching it to a suitable support in relation to the chain drive with which the chain tensioner is to be used. The other end of the chain tensioner is adapted in use to bear and slide on a relatively smooth fixed support 16.

As shown in FIGS. 4 and 5, the blade spring 10 is arcuate in form and has a triangular hole 18 at one end, and a central recess or slot 20 at the other. The triangle is preferably isosceles or near-equilateral or equilateral. One apex of the triangular hole is directed towards the central part of the blade spring. The function of the hole 18 is to receive a projection 24 on the synthetic plastics shoe 12, and the function of the slot 20 is to receive a rib 22, FIG. 10, at the other end of the plastics shoe.

The synthetic plastics shoe 12, shown in FIGS. 6–10, has the aforesaid projection 24 which is triangular in plan as seen in FIG. 8, and this projection has a central bore 26 to receive a split pin by which one end of the blade spring and one end of the shoe are mechanically interlocked.

The triangular shape of the projection 24 has been found to be advantageous in meeting the conflicting requirements that the blade spring should not be too greatly weakened by the hole provided therein, and that sufficient synthetic plastics material should project through the hole to provide an adequate operational rubbing surface against the support 16, as illustrated in FIG. 1.

The other end of the synthetic plastics shoe has a pair of recesses 30, 32 into which the ends 34, 36 (FIG. 4) of the blade spring are received. The central rib 22 locates in the slot 20 and completes the mechanical interlock between the blade spring and the plastics shoe.

It will be appreciated that an alternative mechanical interlock could be employed at this end, for example, the rib 22 could be dispensed with and lateral flanges located bounding a central recess could be substituted. The end of the blade spring would then be correspondingly reduced in width to snugly fit in such a recess, whose width would be reduced compared to the shoe width. Other modifications and equivalents will occur to one skilled in the art.

The invention can be applied with particular advantage in internal combustion engine timing devices having only a short run of chain between adjacent sprockets. The smaller forms of engine with push-rods are normally of this type.

It should be noted that this invention is fundamentally different in construction from the known form of blade spring chain tensioner in which a wear resistant or other coating is provided on and bonded to the blade spring.

In contrast to such a construction, the present invention involves the use of a normally rigid synthetic plastics material which is placed under stress by a blade spring and which, under such stress and under elevated temperatures occurring during operation of the invention, "creeps" to take up a configuration maintaining the tension of the chain.

We claim:

1. A chain tensioner comprising a blade spring, a shoe adapted to contact the chain to be tensioned, said shoe being of synthetic plastics material that will "creep" under load and elevated temperature, and means mechanically interlocking said spring to said shoe so as to place said shoe under stress and maintain tension on said chain.

2. A chain tensioner according to claim 1 in which the synthetic plastics material is a rigid filled nylon.

3. A chain tensioner according to claim 1 in which the spring is mechanically interlocked with the shoe at each end thereof.

4. A chain tensioner according to claim 3 in which the mechanical interlock at one end is by means of an aperture in the blade spring co-operating with a projection from the shoe.

5. A chain tensioner according to claim 4 in which the aperture and projection are triangular.

6. A chain tensioner according to claim 4 in which the projection has a hole therethrough to receive a split pin to secure the spring to the shoe.

7. A chain tensioner according to claim 3 in which the shoe has a recess at the other end to snugly receive the corresponding end of the blade spring.

8. A chain tensioner according to claim 7 in which the said other end of the blade spring is recessed to receive a rib projecting centrally from the rear wall of the recess in the shoe.

References Cited

UNITED STATES PATENTS

| | | | |
|---|---|---|---|
| 2,141,118 | 12/1938 | Weller | 74—242.11 |
| 3,276,282 | 10/1966 | Duncan | 74—242.11 |

FRED C. MATTERN, JR., Primary Examiner

J. A. WONG, Assistant Examiner